(12) United States Patent
Jarossay et al.

(10) Patent No.: US 10,947,857 B2
(45) Date of Patent: Mar. 16, 2021

(54) LABYRINTH SEAL FOR A TURBINE ENGINE OF AN AIRCRAFT

(71) Applicant: SAFRAN AIRCRAFT ENGINES, Paris (FR)

(72) Inventors: Clement Jarossay, Moissy-Cramayel (FR); Guilhem Camille Francois Verron, Moissy-Cramayel (FR); Maurice Guy Judet, Moissy-Cramayel (FR); Clement Raphael Laroche, Moissy-Cramayel (FR); Guillaume Michel Maurice Giliberti, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 131 days.

(21) Appl. No.: 16/140,439

(22) Filed: Sep. 24, 2018

(65) Prior Publication Data
US 2019/0093494 A1 Mar. 28, 2019

(30) Foreign Application Priority Data
Sep. 26, 2017 (FR) ..................... 1758917

(51) Int. Cl.
*F01D 11/02* (2006.01)
*F01D 11/00* (2006.01)
(Continued)

(52) U.S. Cl.
CPC ............ *F01D 11/02* (2013.01); *F01D 11/001* (2013.01); *F01D 11/122* (2013.01);
(Continued)

(58) Field of Classification Search
CPC ...... F01D 11/02; F01D 11/122; F01D 11/001; F05D 250/293; F05D 250/141; F05D 2240/55
See application file for complete search history.

(56) References Cited

U.S. PATENT DOCUMENTS 5,143,383 A * 9/1992 Glynn ..................... F01D 11/02
                                                           277/412
5,429,475 A    7/1995 Mohr
(Continued)

FOREIGN PATENT DOCUMENTS

| DE | 112015000575 | 11/2016 |
| EP | 2213836 A2 | 8/2010 |
| EP | 3056685 | 8/2016 |

OTHER PUBLICATIONS

"French Preliminary Search Report," FR Application No. 1758917 (dated May 14, 2018) (with English translation cover sheet).
(Continued)

*Primary Examiner* — Brian P Wolcott
(74) *Attorney, Agent, or Firm* — Womble Bond Dickinson (US) LLP

(57) ABSTRACT

Labyrinth seal for a turbine engine, in particular of an aircraft, including a rotor element rotating about an axis of rotation, and a stator element extending around the rotor element The rotor element includes a series of annular lips extending radially outwards and surrounded by at least one abradable element carried by the stator element. Each lip includes an inner peripheral body portion, an outer peripheral body portion and an upstream annular face for impact of an air flow during operation. At least one lip has, looking from the upstream annular face, a first annular cavity with a concave rounded cross-section on its inner peripheral body (Continued)

portion and a second annular cavity with a concave rounded cross-section on its outer peripheral body portion.

11 Claims, 3 Drawing Sheets

(51) Int. Cl.
*F01D 11/12* (2006.01)
*F16J 15/447* (2006.01)
(52) U.S. Cl.
CPC .... *F05D 2240/55* (2013.01); *F05D 2250/141* (2013.01); *F05D 2250/293* (2013.01); *F16J 15/4472* (2013.01)

(56) References Cited

U.S. PATENT DOCUMENTS

| | | | |
|---|---|---|---|
| 5,429,478 A | 7/1995 | Krizan et al. | |
| 5,639,095 A * | 6/1997 | Rhode | F16J 15/4472 277/303 |
| 5,984,314 A * | 11/1999 | Peters | F01D 11/02 277/412 |
| 7,445,213 B1 * | 11/2008 | Pelfrey | F01D 11/02 277/418 |
| 8,167,547 B2 * | 5/2012 | Wu | F01D 11/001 277/418 |
| 8,262,356 B2 * | 9/2012 | Ammann | F01D 5/082 415/115 |
| 8,821,115 B2 * | 9/2014 | Bagnall | F01D 11/001 415/171.1 |
| 9,429,022 B2 * | 8/2016 | Matsumoto | F01D 11/001 |
| 9,650,907 B2 * | 5/2017 | Bricaud | F01D 11/02 |
| 9,938,840 B2 * | 4/2018 | Forcier | F01D 11/001 |
| 10,316,675 B2 * | 6/2019 | Kuwamura | F01D 11/02 |
| 10,316,679 B2 * | 6/2019 | Nishikawa | F01D 9/02 |
| 2010/0074733 A1 | 3/2010 | Little | |
| 2012/0091662 A1 * | 4/2012 | Neeli | F01D 11/02 277/420 |
| 2016/0341058 A1 | 11/2016 | Nishikawa et al. | |
| 2019/0112939 A1 * | 4/2019 | Kirner | F01D 9/00 |

OTHER PUBLICATIONS

Office Action received for GB Patent Application No. 1815221.5, dated Mar. 11, 2019, 3 pages.

\* cited by examiner

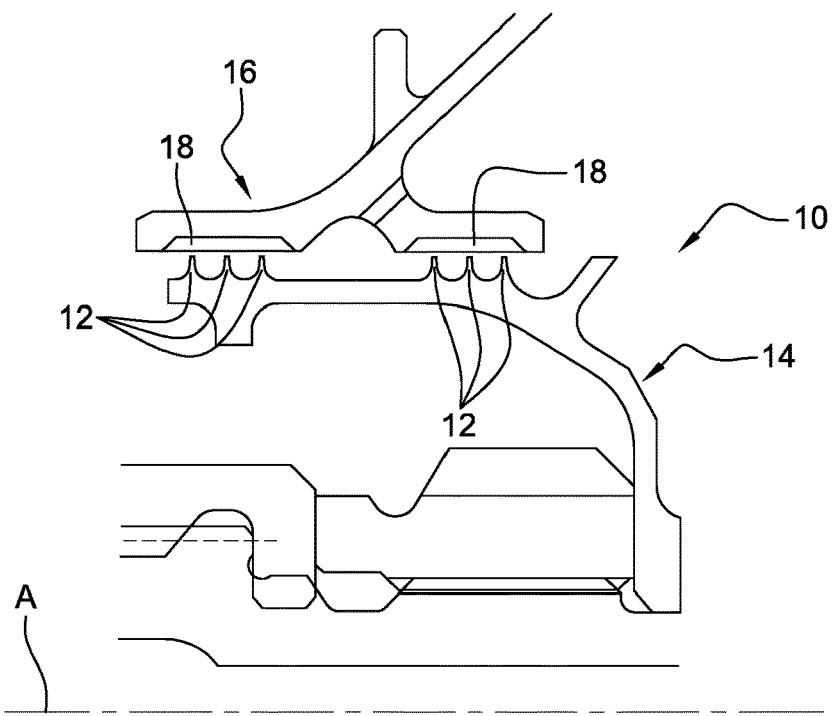
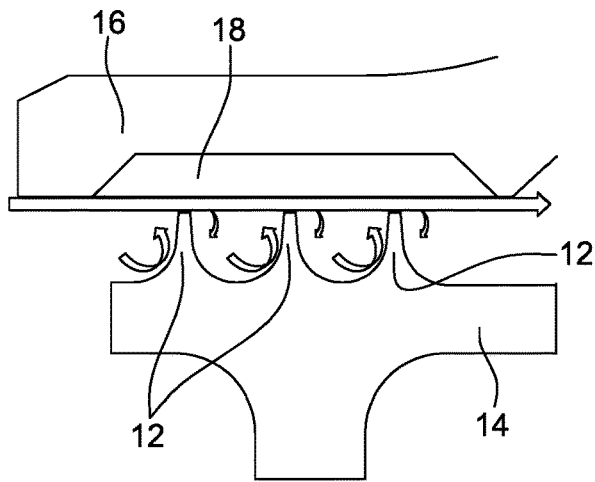
Fig. 1
Fig. 2
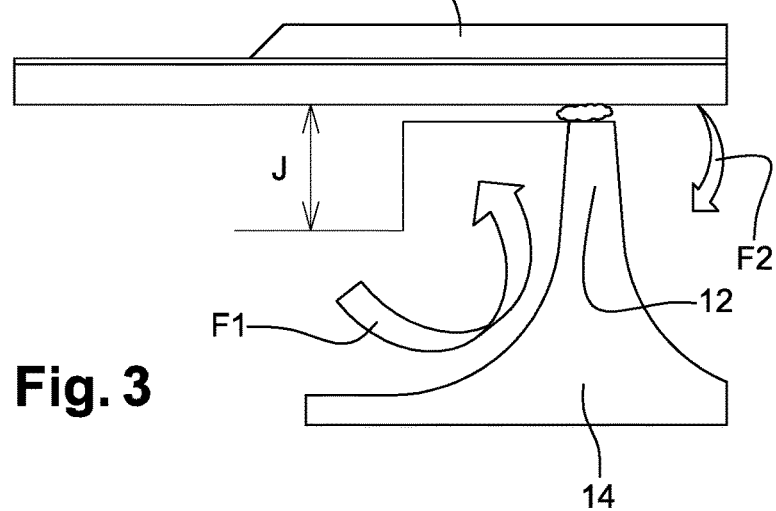
Fig. 3

LABYRINTH SEAL FOR A TURBINE ENGINE OF AN AIRCRAFT

TECHNICAL FIELD

This invention relates to a labyrinth seal for a turbine engine, in particular of an aircraft.

PRIOR ART

The prior art comprises in particular documents U.S. Pat. No. 5,864,314, DE-T5-11 2015 000575, US-A1-2010/074733 and EP-A1-3 056 685.

Providing a turbine engine with labyrinth seals which are dynamic seals the seal of which is provided by rotating lips is known. As is shown in FIG. 1, the lips 12 are carried by a rotor element 14 of the turbine engine 10, which rotates inside a stator element 16, and are surrounded by abradable elements 18 such as blocks or a coating of abradable material carried by this stator element 16.

The purpose of the abradable elements 18 is to protect the lips 12 from risks of wear by contact with the stator element 16 that surrounds them. Contacts with the abradable elements 18 can be avoided or on the contrary sought for example in order to optimise the radial clearances J around the lips. The types of abradable elements 18 and lips 12 can be adapted accordingly.

This technology can be used in order to provide a seal at the tops of the blades of a rotor wheel, these blades carrying annular lips, optionally sectorised, which are surrounded by abradable elements carried by a stator casing (see in particular FR-A1-3 001 759). It can also be used to provide a seal between a portion of shaft or journal and a stator of the turbine engine. The number and the dimensions of the lips are in particular according to the radial space available between the elements to be sealed.

In operation, as is shown in FIGS. 2 and 3, the lips 12 have the function of disturbing the flow of gas that attempts to flow between the elements 14, 16 from upstream to downstream, i.e. from left to right in the drawings. This creates turbulences in the flow of gas which generate pressure drops and as such improve the sealing of the seal.

On each lip 12 to be crossed, the flow of air is disturbed a first time when it impacts the body of the lip (arrow F1). The flow of air crosses the radial clearance J at the top of the lip 12 and then is disturbed a second time (arrow F2) following the sudden increase in the cross-section of passage after passing over the lip. The higher the number of lips 12, the more turbulence is generated in the flow of air, and the more the sealing of the seal is improved.

This invention proposes a development in this technology in order to improve the sealing of the seal simply, effectively and economically.

DISCLOSURE OF THE INVENTION

The invention proposes a labyrinth seal for a turbine engine, in particular of an aircraft, comprising a rotor element rotating about an axis of rotation, and a stator element extending around the rotor element, the rotor element comprising a series of annular lip(s) extending radially outwards and surrounded by at least one abradable element carried by the stator element, each lip comprising an inner peripheral body portion, an outer peripheral body portion and an upstream annular face for impact of an air flow during operation, at least one lip having, looking from said upstream annular face, a first annular cavity with a concave rounded cross-section on its inner peripheral body portion and a second annular cavity with a concave rounded shape on its outer peripheral body portion, said at least one lip having its inner peripheral body portion which has symmetry in relation to a median plane substantially perpendicular to said axis of rotation, characterised in that said second cavity extends from said upstream annular face in the downstream direction, and passes through said median plane.

The second annular cavity at the top of the lip has the purpose of increasing the turbulences in the flow of gas passing over the lips during operation. The phenomenon that takes place at the second cavity is globally the same as the one described hereinabove, except that it is amplified by allowing two flow disturbances at two separate levels of a lip which inhibit the progression of the gases in the turbine engine.

Indeed, on each lip to be crossed the top of which comprises a cavity, the flow of air is disturbed a first time when it impacts the body of the lip and rushes into the first cavity. The flow of air is then disturbed a second time when it flows in the second cavity. It finally crosses the radial clearance at the top of the lip and is disturbed a third time following the increase in the cross-section of passage after passing over the lip. The double concavity according to the invention makes it possible to generate two flow disturbances which inhibit the progression of the gases in the turbine engine. The turbulences in the flow of gas, after passing a lip, are therefore amplified, which makes it possible to improve the performance of the seal.

The invention thus makes it possible, for the same level of sealing, to reduce the size and the weight of the seal, for example by eliminating one of the lips. It also makes it possible, for the same number of lips, to significantly increase the sealing level of the seal. It furthermore makes it possible, for the same level of sealing, to retain the number of lips but to increase the radial clearances with the element that surrounds it so as on the one hand to simplify the integration thereof by reducing the mounting constraints, and on the other hand to facilitate the control of the clearances.

The seal according to the invention can comprise one or more of the following features, taken in isolation from one another or in combination with one another:
- each of said first and second cavities is shaped to orient the flow of air upstream and radially outwards,
- at least two of said lips are separated from one another by an annular space, a maximum radial dimension E1 of which is greater than the maximum radial dimensions E2, E3 respectively of said first and second cavities,
- the ratio E2/E1 is between 20 and 80%, preferably between 40 and 60%,
- the ratio E3/E1 is between 20 and 80%, preferably between 20 and 50%,
- the ratio E3/E2 is between 20 and 60%,
- the outer peripheral body portion is tapered towards the top of the lip,
- the second cavity opens onto the top of the lip,
- the lip comprises at least one additional annular cavity with a concave rounded shape on its upstream annular face,
- the radius of curvature of the first cavity is between 0.5 mm and 2 mm, and the radius of curvature of the second cavity is between 0.8 mm and 2.5 mm.

This invention further relates to a turbine engine, characterised in that it comprises a least one seal as described hereinabove.

DESCRIPTION OF THE FIGURES

The invention will be better understood and other details, characteristics and advantages of the invention will appear more clearly when reading the following description given by way of a non-limiting example and in reference to the accompanying drawings wherein:

FIG. 1 is an axial section diagrammatical half-view of a turbine engine labyrinth seal, according to the prior art;

FIGS. 2 and 3 are diagrammatical views to a larger scale of details of FIG. 1;

DETAILED DESCRIPTION

FIGS. 1 to 3 were described hereinabove.

Figure 4:
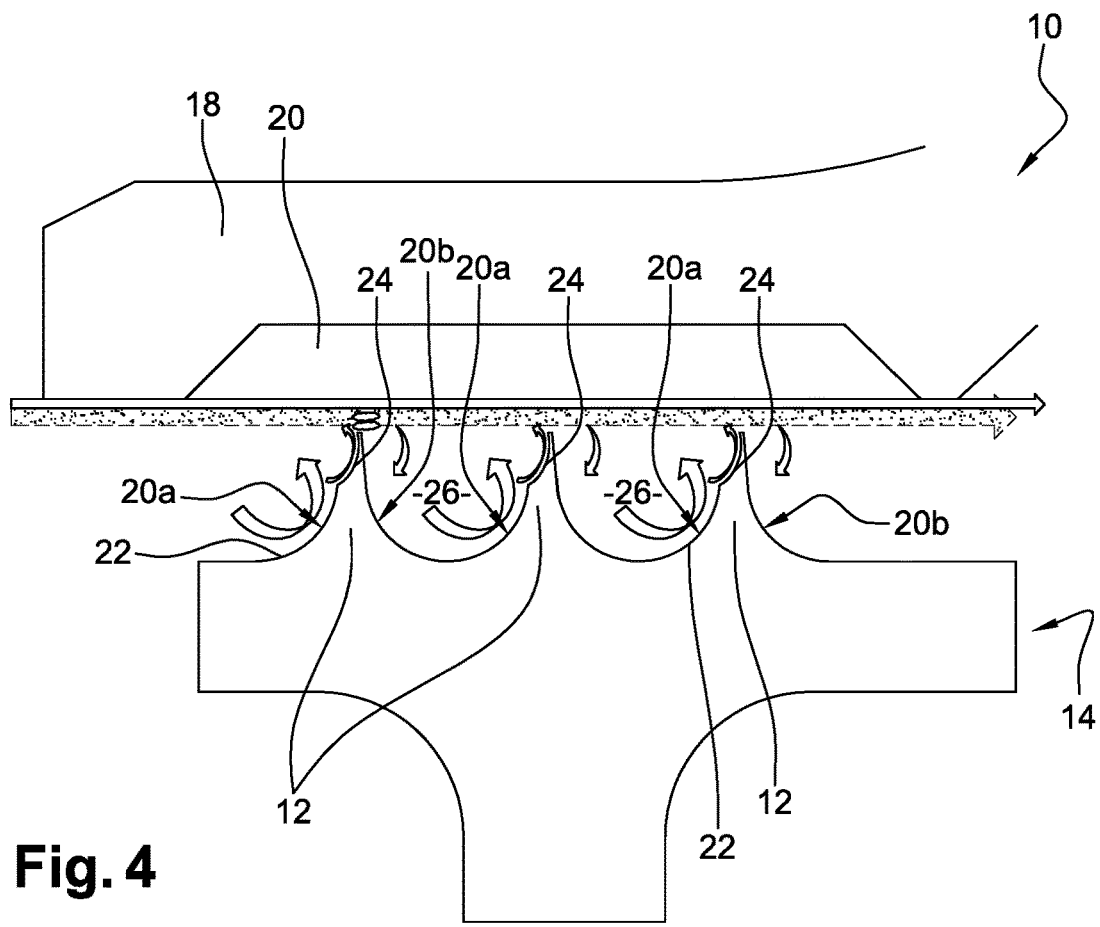
FIG. 4 is an axial section diagrammatical half-view of a turbine engine labyrinth seal, according to the invention.
Figure 5:
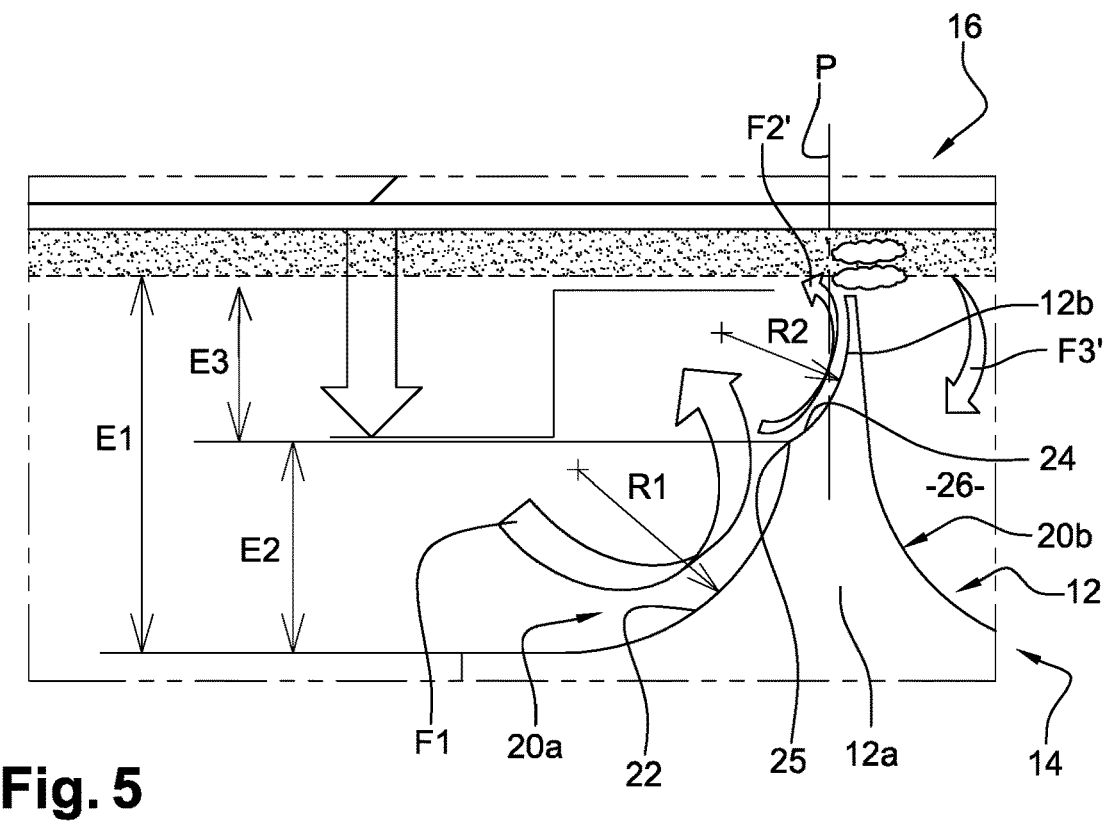
FIG. 5 is a diagrammatical view to a larger scale of a detail of FIG. 4.

FIGS. 4 and 5 show an embodiment of the invention.

As in the prior art, each lip 12 comprises an annular body and a free annular top, in general as a tip, i.e. the width or axial dimension of which is less than that of the body 12a.

In the example shown, the body of the lip comprises an inner peripheral body 12a and an outer peripheral body 12b. The inner peripheral body 12a has symmetry in relation to a median plane P substantially perpendicular to the axis of rotation of the rotor element 14.

Each lip 12 comprises an upstream annular face 20a and a downstream annular face 20b, the flow of gas flowing from upstream to downstream through the seal and more generally in the turbine engine, and from left to right in the drawings.

The inner peripheral body 12a of each lip 12 comprises, looking from the upstream face 20a, a first annular cavity 22 with a section with a concave rounded shape. Due to the symmetry of the inner peripheral body 12a, the latter further comprises, on the side of the downstream face 20b, another annular cavity with a section with a concave rounded shape similar to the first annular cavity 22.

According to the invention, the outer peripheral body 12b comprises the top of the lip, and preferably one or all of the lips has, looking from the upstream face 20a, a second annular cavity 24 with a concave rounded shape formed in this outer peripheral body 12b.

In a seal with two or more lips 12, some or all of the lips can be provided with such first and second cavities. Ideally, they all are.

In the example shown, the bottoms of the cavities 22, 24 come together to form an annular protruding edge, referenced as 25.

The annular cavities 24 which thus extend on the tops of the lips 12 have the purpose of increasing the turbulences in the flow of gas passing over the lips during operation.

More precisely, on each lip 12 to be crossed the inner peripheral body 12a of which comprises a cavity 22, the flow of air is disturbed a first time when it impacts the body of the lip 12. The cavity 22 is configured to divert and guide the flow of air radially outwards (arrow F1). The flow of air then flows in the cavity 24 and is again diverted and guided radially outwards, and therefore to the top of the lip (arrow F2'). The flow of air crosses the radial clearance at the top of the lip and then is disturbed again following the increase in the cross-section of passage after passing over the lip (arrow F3'). The turbulences in the flow of gas, after passing a lip, are therefore amplified with respect to the prior art, which makes it possible to improve the performance of the seal. The geometry of the lips is modified in order to define two cavities that amplify the disturbance of the leakage flow over the lips. The presence of the second cavity causes the formation of a top that is sharper, which maximises the pressure drops.

In the example shown in FIG. 5, each cavity 22, 24 has a cross-section in the general shape of a C and has a radius of curvature noted as R1 or R2. The radius of curvature R1 is for example between 0.5 mm and 2 mm, and the radius of curvature R2 is for example between 0.8 mm and 2.5 mm. These ranges of values are advantageous for causing a disturbance which inhibits the general flow of the gases.

The lips 12 are separated from one another by annular spaces 26 which have a maximum radial dimension noted as E1 (FIG. 5). E1 is greater than the maximum radial dimensions noted as E2 and E3 of the cavities 22, 24.

Advantageously, the ratio E2/E1 is between 20 and 80%, preferably between 40 and 60%, and the ratio E3/E1 is between 20 and 80%, preferably between 20 and 50%.

In the examples shown, the spaces 26 have a cross-section in the general shape of a U.

Figure 6:
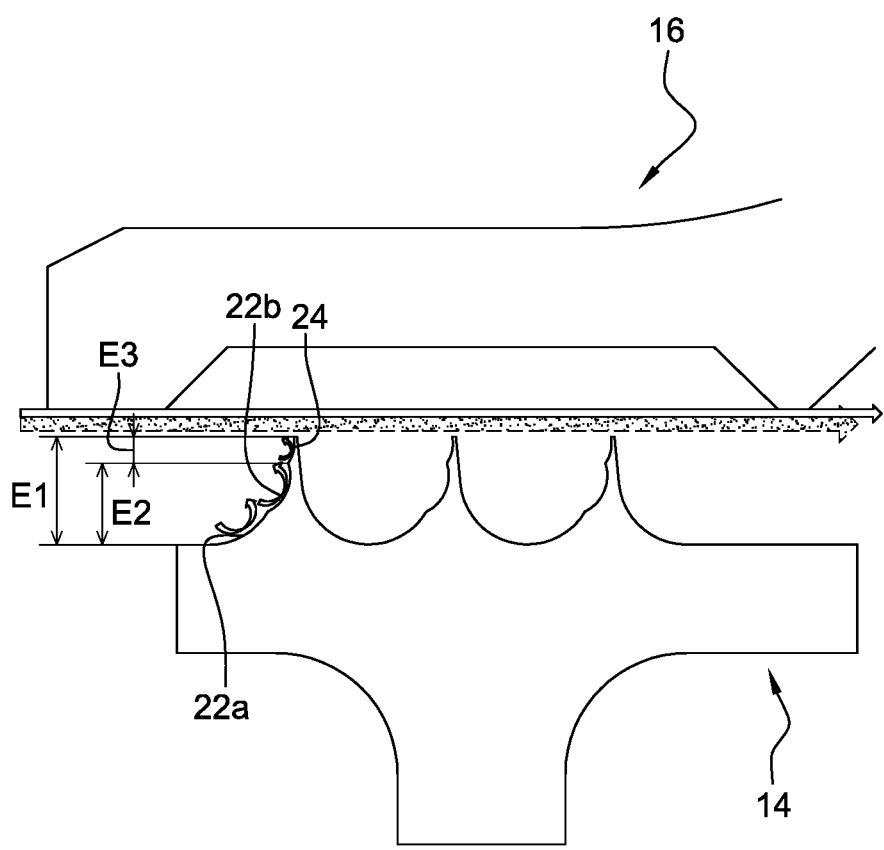
FIG. 6 is a diagrammatical view similar to that of FIG. 4 and showing an alternative embodiment of the invention.

FIG. 6 shows an alternative embodiment wherein the lips each comprise three annular cavities 22a, 22b and 24 with a cross-section with a concave rounded shape. The cavity 24 is similar to that described hereinabove and the aforementioned cavity 22 is replaced with two cavities 22a, 22b arranged radially next to one another on the upstream face 20a of the lip 12. The cavities 22a, 22b have a total radial dimension E2.

Each lip can comprise between two and five lips on its upstream annular face. It is possible to limit the number of cavities to two or three in order to facilitate manufacturing.

The invention claimed is:

1. A labyrinth seal for a turbine engine, comprising a rotor element rotating about an axis of rotation, and a stator element extending around the rotor element, the rotor element comprising a series of annular lips extending radially outwards and surrounded by at least one abradable element carried by the stator element, each said annular lip comprising an inner peripheral body portion, an outer peripheral body portion and an upstream annular face for impact of an air flow during operation, at least one lip of said series of annular lips having, looking from said upstream annular face, a first annular cavity with a concave rounded cross-section on its inner peripheral body portion and a second annular cavity with a concave rounded cross-section on its outer peripheral body portion, wherein the radius of curvature of the first cavity is between 0.5 mm and 2 mm, and the radius of curvature of the second cavity is between 0.8 mm and 2.5 mm.

2. The seal according to claim 1, wherein each one of said first and second cavities is shaped to direct the air flow of air upstream and radially outwards.

3. The seal according to claim 1, wherein said at least one lip having its inner peripheral body portion which has symmetry in relation to a median plane substantially perpendicular to said axis of rotation, wherein said second cavity extends from said upstream annular face in the downstream direction, and passes through said median plane.

4. The seal according to claim 1, wherein at least two lips of said series of annular lips are separated from one another by an annular space a maximum radial dimension E1 of which is greater than the maximum radial dimensions E2, E3 respectively of said first and second cavities.

5. The seal according to claim 4, wherein the ratio E2/E1 is between 20 and 80%.

6. The seal according to claim 4, wherein the ratio E3/E1 is between 20 and 80%.

7. The seal according to claim 1, wherein the outer peripheral body portion is tapered towards a top of the at least one lip.

8. The seal according to claim 1, wherein the second cavity opens onto a top of the at least one lip.

9. The seal according to claim 1, wherein the radius of curvature of the first cavity is between 0.5 mm and 2 mm, and the radius of curvature of the second cavity is between 0.8 mm and 2.5 mm.

10. The seal according to claim 1, wherein the at least one lip comprises at least one additional annular cavity with a concave rounded cross-section on its upstream annular face.

11. A turbine engine, which comprises a least one seal according to claim 1.

\* \* \* \* \*